(12) United States Patent
Wu et al.

(10) Patent No.: US 11,644,524 B2
(45) Date of Patent: May 9, 2023

(54) ULTRA-WIDEBAND LOCALIZATION METHOD, DEVICE, AND SYSTEM

(71) Applicant: PSJ INTERNATIONAL LTD., Tortola (VG)

(72) Inventors: Ruey-Beei Wu, Taipei (TW); Yu-Er Chen, Taichung (TW)

(73) Assignee: PSJ INTERNATIONAL LTD., Tortola (VG)

( * ) Notice: Subject to any disclaimer, the term of this patent is extended or adjusted under 35 U.S.C. 154(b) by 138 days.

(21) Appl. No.: 17/194,317

(22) Filed: Mar. 8, 2021

(65) Prior Publication Data

US 2022/0146618 A1   May 12, 2022

(30) Foreign Application Priority Data

Nov. 6, 2020   (TW) .................................. 109138740

(51) Int. Cl.
  *G01S 5/02*   (2010.01)
  *G01S 13/02*   (2006.01)
  *H04B 17/27*   (2015.01)

(52) U.S. Cl.
  CPC ............ *G01S 5/021* (2013.01); *G01S 5/0226* (2013.01); *G01S 5/0242* (2013.01); *G01S 5/0244* (2020.05); *G01S 5/0289* (2013.01); *G01S 13/0209* (2013.01); *H04B 17/27* (2015.01)

(58) Field of Classification Search
  CPC .... G01S 5/021; G01S 13/0209; G01S 5/0226; G01S 5/0289; G01S 5/0244; H04B 17/27
  See application file for complete search history.

(56) References Cited

U.S. PATENT DOCUMENTS

| | | | |
|---|---|---|---|
| 2014/0145878 A1 | 5/2014 | Barlett et al. | |
| 2019/0212434 A1* | 7/2019 | Ding | ..................... G01S 5/0242 |
| 2020/0041601 A1* | 2/2020 | Ko | ........................... B25J 5/007 |

FOREIGN PATENT DOCUMENTS

| | | |
|---|---|---|
| CN | 107911864 A | 4/2018 |
| CN | 111667216 A | 9/2020 |
| TW | 202037205 A | 10/2020 |
| WO | WO2020177225 A1 | 9/2020 |

OTHER PUBLICATIONS

Chin E Lin, et al., "TCAS algorithm for general aviation based on ADS-B", Journal of Aerospace Engineering, 2016, pp. 1569-1591.

* cited by examiner

*Primary Examiner* — Muthuswamy G Manoharan
(74) *Attorney, Agent, or Firm* — Li & Cai Intellectual Property Office

(57) ABSTRACT

An ultra-wideband (UWB) localization method, a UWB localization device, and a UWB localization system are provided. The UWB method includes: determining whether or not a plurality of UWB hardware measurement deviations are calibrated; determining, when the UWB hardware measurement deviations are calibrated, whether or not a plurality of anchor coordinates of anchors are automatically measured; obtaining, when the anchor coordinates of the anchors are automatically measured, a plurality of measurement distances between each of the anchors and a tag, respectively, and deducting the UWB hardware measurement deviations from the measurement distances, respectively; and calculating a tag coordinate of the tag according to the measurement distances from which the UWB hardware measurement deviations are deducted.

15 Claims, 13 Drawing Sheets

ULTRA-WIDEBAND LOCALIZATION METHOD, DEVICE, AND SYSTEM

CROSS-REFERENCE TO RELATED PATENT APPLICATION

This application claims the benefit of priority to Taiwan Patent Application No. 109138740, filed on Nov. 6, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a localization method, device, and system, and more particularly to an ultra-wideband localization method, device, and system.

BACKGROUND OF THE DISCLOSURE

Unmanned aerial vehicles (UAVs), unmanned aircrafts (UAS) or drones can be classified according to fields of utilization, e.g., military, commercial, and entertainment. In recent years, the market for small-sized drones is growing. Since the small-sized drones have advantages of easy deployment, low maintenance costs, and high mobility, the small-sized drones can be used for various commercial applications. For example, commercial drones can be used for aerial photography, package delivery service, pesticide spraying, and bridge structure inspections.

As applications of UAVs (e.g., drones) become more and more diversified, more and more UAVs are likely to perform different tasks in the air in the future, and a large number of UAVs require an air traffic management center to monitor the statuses and locations of all UAVs. FIG. 1 is a schematic view of a UAV traffic management (UTM) system. As stipulated in Civil Aeronautics Administration regulations, airspace higher than 400 feet above sea level is categorized as high-altitude airspace that is beyond visual line of sight (BVLoS), and airspace below 400 feet above sea level is categorized as low-altitude airspace that is within visual line of sight (VLoS). For example, in Taiwan, the competent authority of the National UTM (NUTM) system for the high-altitude airspace is the Civil Aeronautics Administration, and competent authorities of the Regional UTM (RUTM) system for the low-altitude airspace are local government institutions. The functions of the RUTM system in a metropolitan area include: detection and avoidance (DAA) of small-sized UAVs, maintenance of safety distances for fleets, electronic fencing, airspace traffic management, planning of take-off and landing areas, monitoring of UAV signal strength, etc. The DAA of UAVs can be achieved through using automatic dependent surveillance-broadcast like (ADS-B like) systems. Specifically speaking, the small-sized UAVs can autonomously transmit localization data to the air traffic control center or broadcast to the adjacent small-sized UAVs, the Traffic Collision Avoidance System (TCAS) in the air traffic management center can calculate localization data through software and evaluate whether or not the UAVs in the airspace are likely to collide with one another, and then send warning signals to the UAVs that are required to perform avoidance maneuvering. (Reference: C. E. Lin, T. W. Hung, H. Y. Chen, "TCAS Algorithm for Generation Aviation on ADS-B", Proceedings of the Institution of Mechanical Engineers, Part G, Journal of Aerospace Engineering, Vol. 230(9), IMechE 2016, pp. 1569-1591, DOI: 10.1177/0954410016631974).

Nowadays, most small-sized UAVs use the Global Positioning System (GPS) for localization. However, altitude deviations of the GPS in urban areas are usually greater than or equal to 5 meters. The altitude deviations can cause the TCAS to err in determinations of DAA, which affects aviation safety of the small-sized UAVs.

In addition, standardized management regulations have been stipulated by countries around the world for UAVs (or remotely controlled drones). For example, a user is required to pass an aeronautical knowledge test to obtain a remote pilot certificate, so as to ensure aviation safety. In the aeronautical knowledge test, the performance test in certain regions is conducted under a condition of a UAV having the GPS thereof turned off. The user then remotely controls the UAV to fly through a specific aviation route (e.g., flying in a pentagon-shaped aviation route while maintaining an altitude of 20 meters, and flying in an aviation route of a shape of the number "8" while maintaining an altitude of 50 meters, etc.). Afterwards, an examiner determines whether or not the user has passed the test through visual inspection. However, since the GPS of the UAV has been turned off and the UAV cannot autonomously transmit localization data to the air traffic management center, whether or not the user passes the test and is qualified are only determined subjectively by the examiner, so that the above-mentioned test lacks objective data to support the effectiveness thereof.

Therefore, it has become an important issue in the industry to provide a localization method, device, and system having a high accuracy (e.g., having a localization deviation being less than one meter) to overcome the above-mentioned inadequacies.

SUMMARY OF THE DISCLOSURE

In response to the above-referenced technical inadequacies, the present disclosure provides an ultra-wideband (UWB) localization method, device, and system.

In one aspect, the present disclosure provides an ultra-wideband (UWB) localization method that is adapted to a UWB localization system. The UWB localization system includes a tag and a plurality of anchors. The UWB localization method includes: determining whether or not a plurality of UWB hardware measurement deviations are calibrated; determining, when the UWB hardware measurement deviations are calibrated, whether or not a plurality of anchor coordinates of the anchors are automatically measured; obtaining, when the anchor coordinates of the anchors are automatically measured, a plurality of measurement distances between each of the anchors and the tag, respectively, and deducting the UWB hardware measurement deviations from the measurement distances, respectively; and calculating a tag coordinate of the tag according to the measurement distances from which the UWB hardware measurement deviations are deducted.

In another aspect, the present disclosure provides a UWB localization device that is adapted to a UWB localization system. The UWB localization system includes a tag, a plurality of anchors, and a traffic management cloud server.

The UWB localization device is disposed on the tag, and includes a distance measurement module, a first communication module, and a processing module. The distance measurement module is used for measuring a plurality of measurement distances between each of the anchors and the tag, respectively, and for measuring a plurality of actual altitudes between the tag and a datum plane. The first communication module is coupled to the distance measurement module, and is used to transmit the measurement distances and the actual altitudes. The processing module is coupled to the first communication module, and is used to calculate a tag coordinate of the tag according to the measurement distances and the actual altitudes and then transmit the tag coordinate to the traffic management cloud server.

In yet another aspect, the present disclosure provides a UWB localization system including a tag, a plurality of anchors, a traffic management cloud server, and a UWB localization device configured on the tag. The UWB localization device includes a distance measurement module, a first communication module, and a processing module. The distance measurement module is used for measuring a plurality of measurement distances between each of the anchors and the tag, respectively, and for measuring a plurality of actual altitudes between the tag and a datum plane. The first communication module is coupled to the distance measurement module, and is used to transmit the measurement distances and the actual altitudes. The processing module is coupled to the first communication module, and is used to calculate a tag coordinate of the tag according to the measurement distances and the actual altitudes and then transmit the tag coordinate to the traffic management cloud server.

One of the beneficial effects of the UWB localization method, device, and system of the present disclosure is that the UWB localization method, device, and system can increase localization accuracy of a Z-axis coordinate through technical solutions of "measuring the measurement distances between the tag and the anchors, respectively, through the UWB wireless communication technology" and "calculating a third coordinate component of the tag coordinate according to a cost function".

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
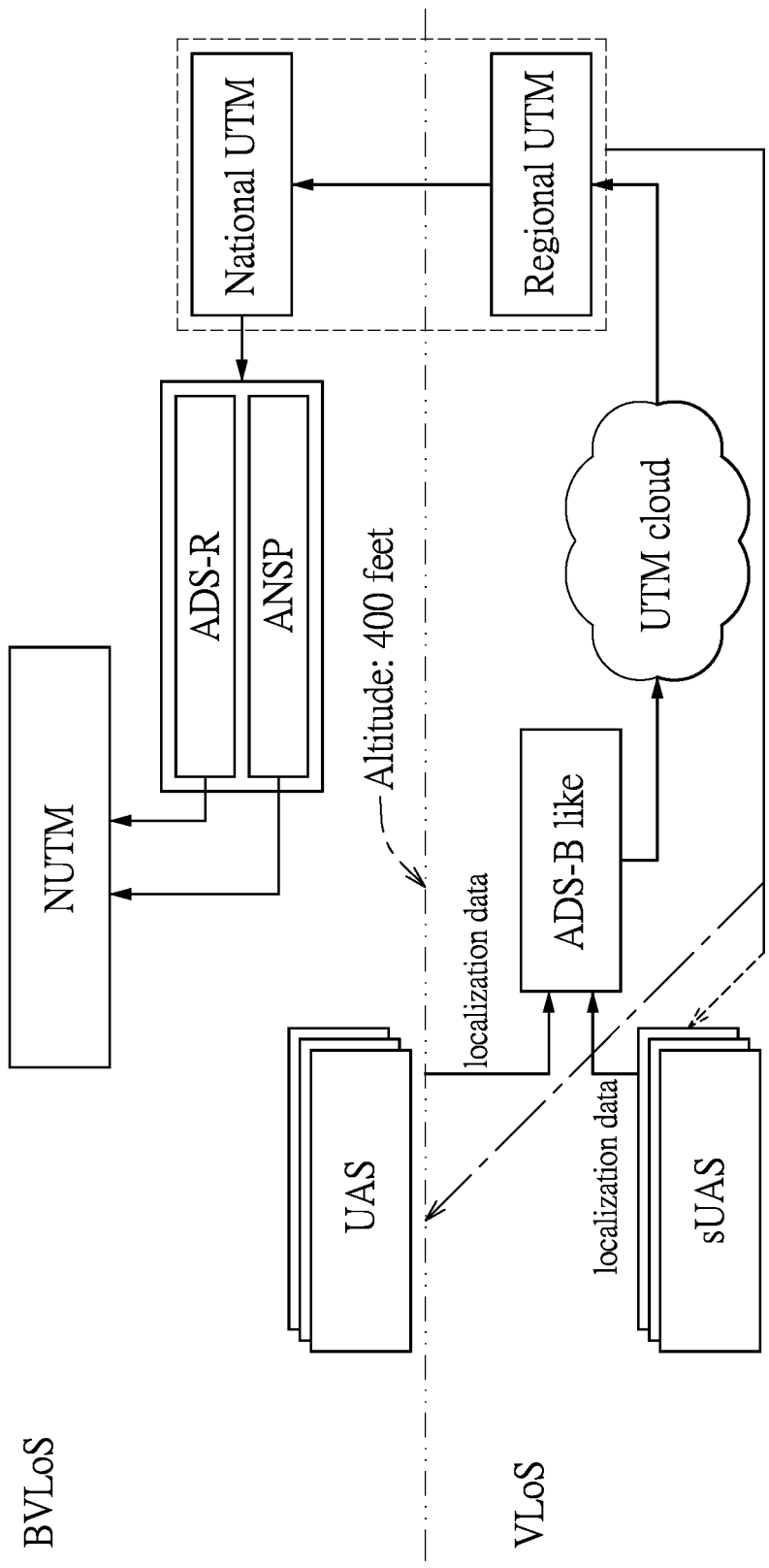
FIG. 1 is a schematic view of an unmanned aerial vehicle (UAV) traffic management system.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

EMBODIMENT

Figure 2:
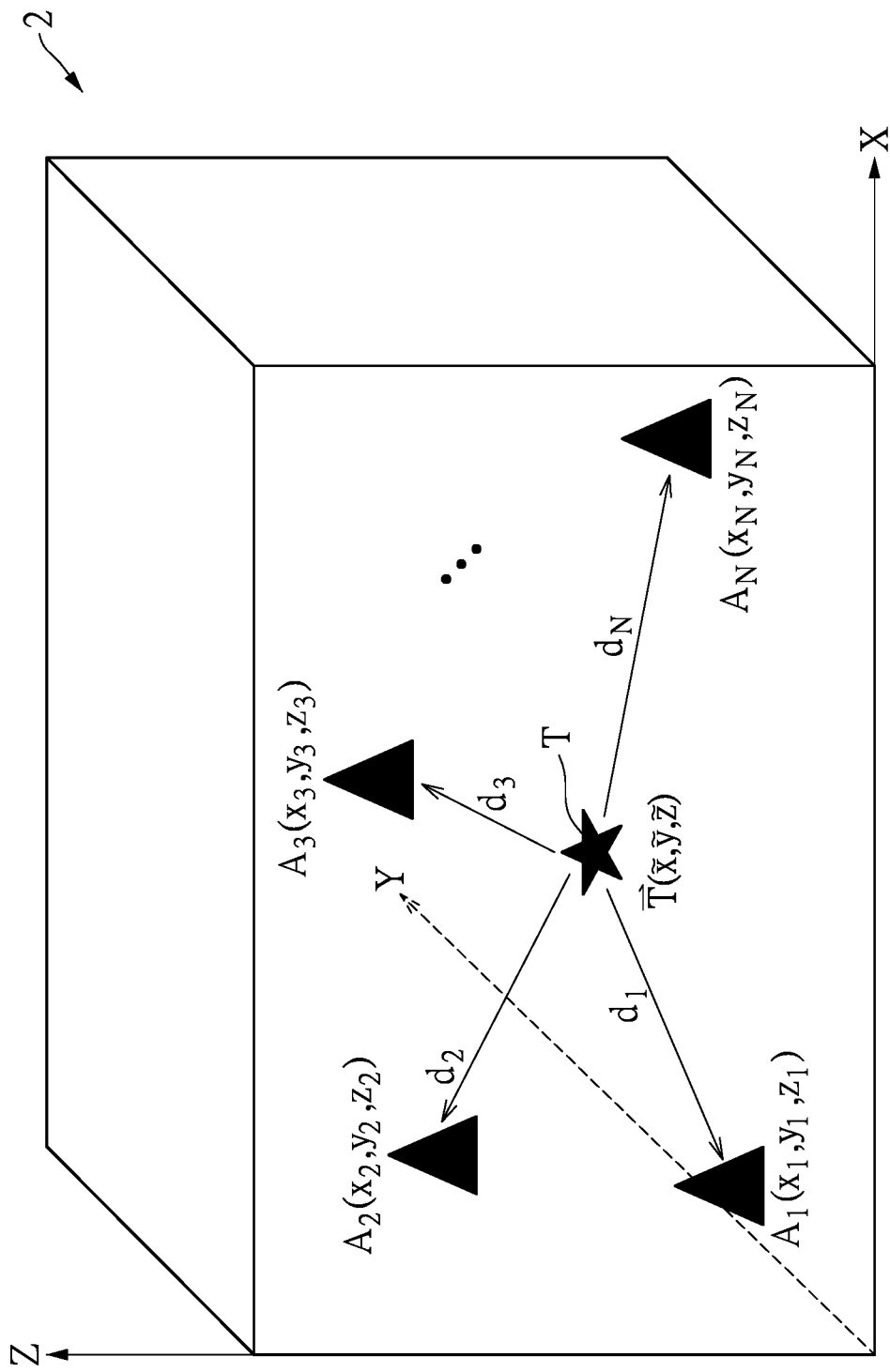
FIG. 2 is a schematic view of an ultra-wideband localization model according to an embodiment of the present disclosure.

Referring to FIG. 2, FIG. 2 is a schematic view of an ultra-wideband (UWB) localization model 2 according to an embodiment of the present disclosure. The UWB localization model 2 can be used to simulate a UWB localization system, including a tag T (i.e., an unmanned aerial vehicle (UAV), an unmanned aircraft (UAS), or a drone) and a plurality of anchors $A_1$ to $A_N$, where N is an integer greater than three. A plurality of distances between the tag T and the anchors $A_1$ to $A_N$ are respectively $d_1$ to $d_N$, and the measurement distances $d_1$ to $d_N$ are calculated through a double-sided two-way ranging method using the UWB wireless communication technology. In other words, the tag T and each of the anchors $A_1$ to $A_N$ send UWB packets to each other and record transmission timestamps and receiving timestamps, respectively, and a distance measurement module of the tag T (e.g., the distance measurement module 31 shown in FIG. 3) calculates a plurality of times of flight (ToF) of the UWB packets accordingly, and then multiply the ToFs by the speed of light to infer corresponding distances (the measurement distances $d_1$ to $d_N$) between the tag T and each of the anchors $A_1$ to $A_N$.

In a three-dimensional model composed of X, Y, and Z axes, assuming that a coordinate of the tag T is $\vec{T}(\tilde{x},\tilde{y},\tilde{z})$, and coordinates of the anchors $A_1$ to $A_N$ are known to be $A_1(x_1, y_1, z_1)$ to $A_N(x_N, y_N, z_N)$, a distance $d_i$ between the tag T and an $i^{th}$ anchor $A_i$ can be expressed by the following equation (1):

$$(\tilde{x}-x_i)^2+(\tilde{y}-y_i)^2+(\tilde{z}-z_i)^2=d_i^2 \qquad (1);$$

in which i is an integer, and $1 \leq i \leq N$.

Taking the anchor $A_N$ as a reference point, the distance $d_N$ between the tag T and the anchor $A_N$ can be expressed by the following equation (2):

$$(\tilde{x}-x_N)^2+(\tilde{y}-y_N)^2+(\tilde{z}-z_N)^2=d_N^2 \qquad (2);$$

when $\tilde{x}-x_i=\tilde{x}-x_N-(x_i-x_N), \tilde{y}-y_i=\tilde{y}-y_N-(y_i-y_N), \tilde{z}-z_i=\tilde{z}-z_N-(z_i-z_N)$, equation (1) can be rewritten as the following equation (3):

$$((\tilde{x}-x_N)-(x_i-x_N))^2+(\tilde{y}-y_N)-(y_i-y_N))^2+((\tilde{z}-z_N)-(z_i-z_N))^2=d_i^2 \qquad (3);$$

by subtracting equation (1) from equation (3) and then organizing, the following equation (4) is obtained:

$$(x_i-x_N)(\tilde{x}-x_N)+(y_i-y_N)(\tilde{y}-y_N)+(z_i-z_N)(\tilde{z}-z_N)=\tfrac{1}{2}(R_{iN}^2-d_i^2+d_N^2) \qquad (4);$$

in which, $R_{iN}^2=(x_i-x_N)^2+(y_i-y_N)^2+(z_1-z_N)^2$.

Finally, the equation (4) is rewritten into a matrix form as the following equation (5), and the coordinate $\vec{T}(\tilde{x}, \tilde{y}, \tilde{z})$ of the tag T can be obtained through a least squares error (LSQ) method.

However, when a height of the tag T (i.e., the Z-axis coordinate $\tilde{z}$) is multiple times the height of the anchors $A_1$ to $A_N$ (i.e., the Z-axis coordinates $Z_1$ to $Z_N$), under a premise that the LSQ method is used to solve the equations, Z-axis spans between the anchors $A_1$ to $A_N$ are very small relative to the Z-axis coordinate $\tilde{z}$ of the tag T, thereby causing altitude deviations on the scale of meters. In practice, under the premise that the LSQ method is used to solve the equations, in order to reduce the altitude deviations of the UAV (i.e., the tag T) that is tens of meters above the ground to be on the scale of centimeters, altitude differences among the anchors $A_1$ to $A_N$ are required to be increased, which is unpractical. On the other hand, since X-axis spans and Y-axis spans between the anchors $A_1$ to $A_N$ are large enough relative to an X-axis coordinate and a Y-axis coordinate of the tag T, the deviations solved by the LSQ method in the horizontal plane (i.e., the XY plane) are on the scale of centimeters. Accordingly, the X-axis coordinate $\tilde{x}$ and the Y-axis coordinate $\tilde{y}$ obtained from equations (1) to equation (5) can be substituted as constants, equation (1) is then rewritten, and the rewritten equation (1) is substituted into a cost function, indicated as equation (6), so as to calculate the Z-axis coordinate $\tilde{z}$ of the tag T. In other words, the cost function of the present disclosure improves a conventional method of solving three unknowns to a method of solving only one unknown, through subtracting the X-axis coordinate component $\tilde{x}$ and the Y-axis coordinate component $\tilde{y}$ from the distance $d_i$ measured by the UWB ranging method, and then calculating the Z-axis coordinate $\tilde{z}$ according to the cost function.

In a scenario of a UAV operation test (e.g., a performance test), the anchors $A_1$ to $A_N$ are arranged on the ground or close to the ground, and the UAV can then fly above the anchors $A_1$ to $A_N$. Accordingly, according to the scenario in practice, it is assumed in the present disclosure that the height of the tag T (i.e., the Z-axis coordinate $\tilde{z}$) is greater than an average height $\bar{z}$ of the anchors $A_1$ to $A_N$, and with the average height being $\bar{z}=1/N\Sigma_{i=1}^{N}z_i$, a parameter is defined as $z'_i \triangleq =z_i-\bar{z}$ (i.e., under a premise that the Z-axis coordinates $Z_1$ to $Z_N$ of the anchors $A_1$ to $A_N$ are known, the parameter $z'_i$ is defined as a difference between the Z-axis coordinate $Z_i$ of the $i^{th}$ anchor $A_i$ and the average height $\bar{z}$), such that the cost function of the present disclosure can be expressed as equation (6) in the following:

$$\varepsilon(\tilde{z}')=1/N\times\Sigma_{i=1}^{N}[(\tilde{z}'-z'_i)^2-d'^2_i]^2 \qquad (6);$$

in which, $d'^2_i=d_1^2-[(\tilde{x}-x_i)^2+(\tilde{y}-y_i)^2]$.

According to equation (6), the parameter $d'_i$ is a value obtained by subtracting the X-axis coordinate component $\tilde{x}$ and the Y-axis coordinate component $\tilde{y}$ from the distance $d_i$ measured by the UWB ranging method. Since the parameters $z'_i$ and $d'_i$ are known, only a single variable $\tilde{z}'$ in equation (6) needs to be solved.

In order to minimize the altitude deviations, the best solution of the variable $\tilde{z}'$ in equation (6) satisfies a condition of $d\varepsilon/(d\tilde{z}')=0$, such that equation (6) can be differentiated to obtain equation (7) as follows:

$$f(\tilde{z}')=\tilde{z}'^3-A\tilde{z}'+B=0 \qquad (7);$$

in which, $A=1/N\times\Sigma_{i=1}^{N}d'^2_i-3/N\times\Sigma_{i=1}^{N}z'^2_i$, $B=1/N\times\Sigma_{i=1}^{N}d'^2_iz'_i-1/N\times\Sigma_{i=1}^{N}z'^3_i$.

Next, Newton's approximation method as shown in equation (8) is used to obtain the solution of the variable $\tilde{z}'$ of equation (7), and iterated to $(\tilde{z}'_{n+1}-\tilde{z}'_n)<0.01$ (unit: meter), in which the variable $\tilde{z}'_{n+1}$ is a solution of equation (7), and then the average height $\bar{z}$ of the anchors $A_1$ to $A_N$ is added to the variable $\tilde{z}'_{n+1}$, so as to obtain the height of the tag T. Equation (8) is expressed as follows:

$$\tilde{z}'_{n+1}=\tilde{z}'_n-(f(\tilde{z}'_n))/(f'(\tilde{z}'_n)) \qquad (8).$$

Figure 3:
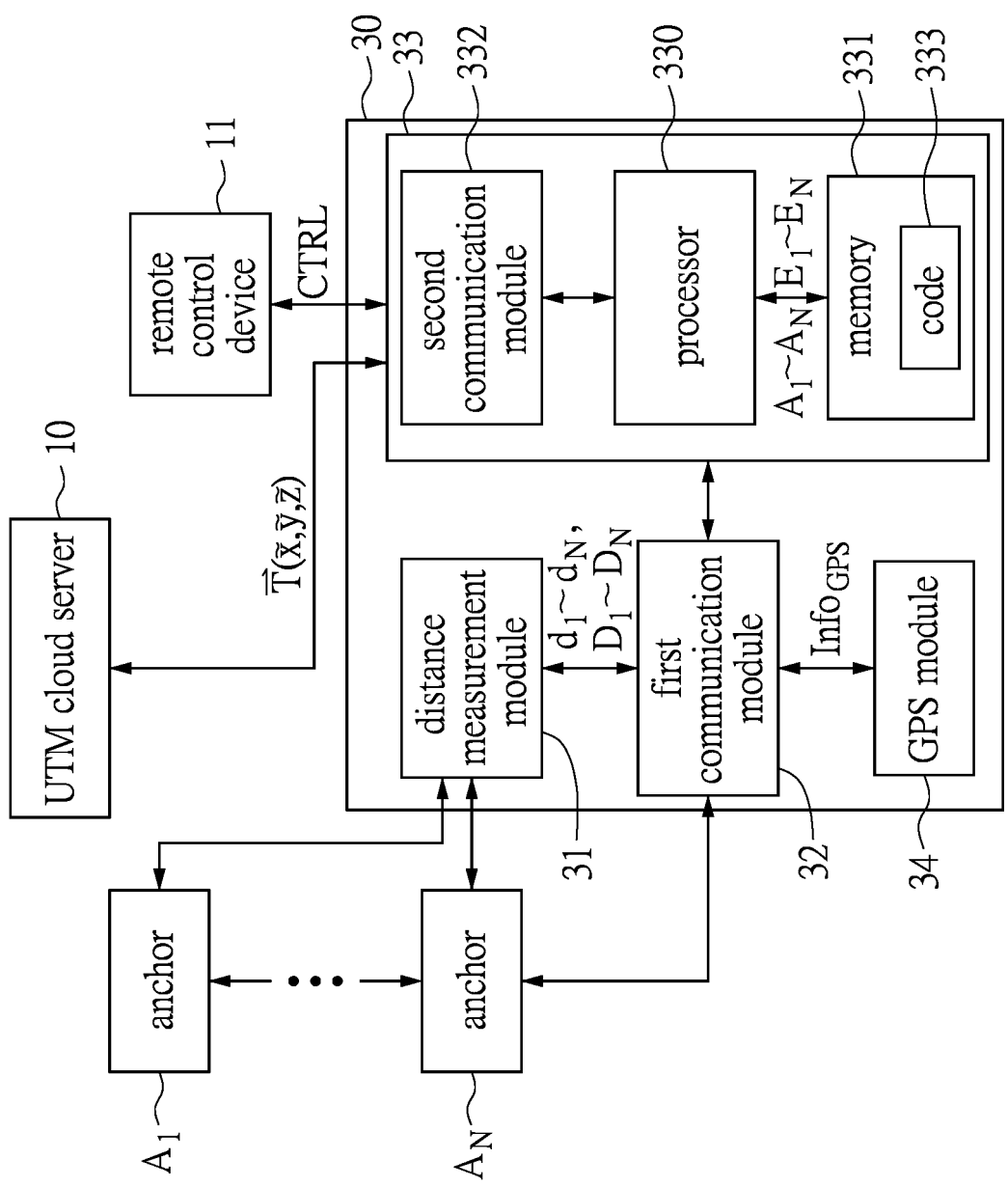
FIG. 3 is a functional block diagram of a localization device according to one embodiment of the present disclosure.

FIG. 3 is a functional block diagram of a localization device 30 according to one embodiment of the present disclosure. The localization device 30 can be configured on the tag T (i.e., a UAV, a UAS, or a drone) shown in FIG. 2 to implement the UWB localization model 2 shown in FIG. 2, and can be applied to the UAV traffic management (UTM) system shown in FIG. 1. The localization device 30 includes a distance measurement module 31, a first communication module 32, a processing module 33 and a global positioning system (GPS) module 34.

The distance measurement module 31 is coupled to the first communication module 32, and is used to measure the measurement distances $d_1$ to $d_N$ between the localization device 30 (i.e., the UAV) and the anchors $A_1$ to $A_N$ through the UWB wireless communication technology. The GPS module 34 is coupled to the first communication module 32 for generating GPS information $Info_{GPS}$.

The first communication module 32 is coupled to the distance measurement module 31, the GPS module 34, and the processing module 33, and the first communication module 32 is used to transmit the measurement distances $d_1$ to $d_N$ measured by the distance measurement module 31, a plurality of actual altitudes $D_1$ to $D_N$ of the localization device 30, and the GPS information $Info_{GPS}$ generated by the GPS module 34 to the processing module 33. In one embodiment, the localization device 30 further includes a height measurement module (not shown in FIG. 3) for measuring the actual altitudes $D_1$ to $D_N$ between the localization device 30 and a datum plane according to an infrared ranging method. In one embodiment, the height measurement module can be integrated in the distance measurement module 31. In one embodiment, the height measurement module may be a peripheral device that is externally connected to the localization device 30.

The processing module 33 is coupled to the first communication module 32, and is used to calculate the coordinate $\vec{T}(\tilde{x},\tilde{y},\tilde{z})$ of the tag T according to the measurement distances $d_1$ to $d_N$ and the actual altitudes $D_1$ to $D_N$, and then transmit the coordinate $\vec{T}(\tilde{x},\tilde{y},\tilde{z})$ to at least one of a traffic management cloud server, i.e., a UAV traffic management (UTM) cloud server 10, and a remote control device 11. In one embodiment, the processing module 33 is used to execute or terminate a localization operation according to a control signal CTRL generated by the remote control device 11.

The processing module 33 includes a processor 330, a memory 331, and a second communication module 332. The processor 330 is coupled to the first communication module 32, the memory 331, and the second communication module 332, and the processor 330 is used to calculate a plurality of UWB hardware measurement deviations $E_1$ to $E_N$ of the distance measurement module 31 and a plurality of anchor coordinates $A_1(x_1, y_1, z_1)$ to $A_N(x_N, y_N, z_N)$ of the anchors $A_1$ to $A_N$ according to the measurement distances $d_1$ to $d_N$ and the actual altitudes $D_1$ to $D_N$. Next, the processing module 33 can apply the measurement distances $d_1$ to $d_N$ and the anchor coordinates $A_1(x_1, y_i, z_1)$ to $A_N(x_N, y_N, z_N)$ to the UWB localization model 2 shown in FIG. 2, so as to calculate the coordinate $\vec{T}(\tilde{x},\tilde{y},\tilde{z})$ of the tag T accordingly.

The memory 331 is coupled to the processing module 33 for storing a code 333, the measurement distances $d_1$ to $d_N$, the actual altitudes $D_1$ to $D_N$, the UWB hardware measurement deviations $E_1$ to $E_N$, the anchor coordinates $A_1(x_1, y_1, z_1)$ to $A_N(x_N, y_N, z_N)$, and any information related to the localization device 30.

The second communication module 332 is coupled to the processor 330, the UTM cloud server 10, and the remote control device 11, and is used to transmit the coordinate $\vec{T}(\tilde{x},\tilde{y},\tilde{z})$ to at least one of the UTM cloud server 10 and the remote control device 11 and receives the control signal CTRL generated by the remote control device 11.

Therefore, under the circuit structure shown in FIG. 3, the localization device 30 of the present disclosure can implement the UWB localization model 2 shown in FIG. 2, and the localization device 30 can be applied to the UTM system shown in FIG. 1. In the scenario of the UAV operation test, under a premise that the GPS module 34 is turned off, the localization device 30 of the present disclosure can be configured on the UAV and used to transmit the coordinate $\vec{T}(\tilde{x},\tilde{y},\tilde{z})$ of the tag T to the UTM cloud server 10 or a related UAV operation test system to provide objective localization information or data to support an effectiveness of the UAV operation test. For example, the UWB localization model 2 of the present disclosure can simulate a UWB localization system to provide the objective localization information or data to support the effectiveness of a UAV operation test or a UAV operation competition, and can be the equivalent of an electronic referee.

Figure 4:
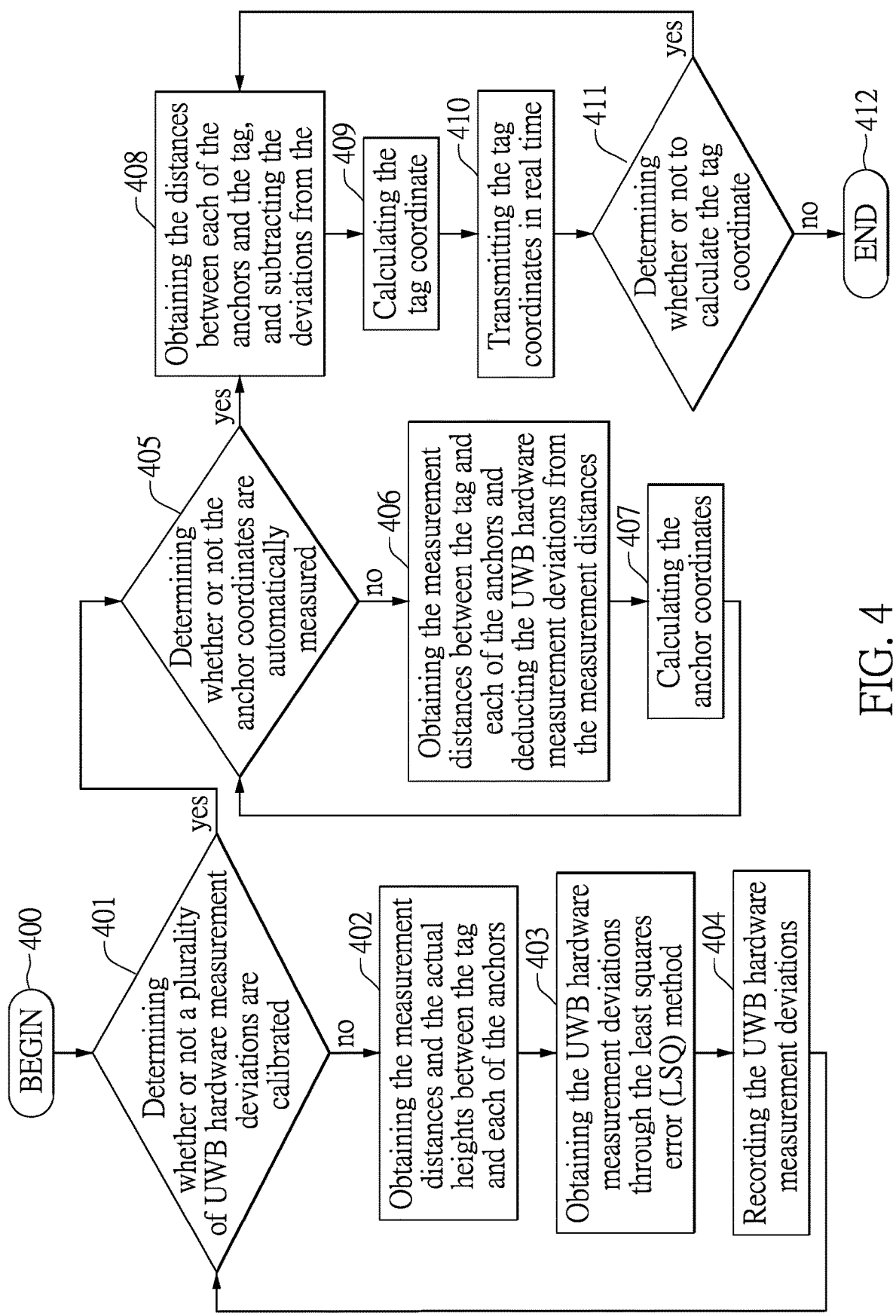
FIG. 4 is a flowchart showing a localization method adapted to the localization device shown in FIG. 3 according to one embodiment of the present disclosure.

FIG. 4 is a flowchart showing a localization method adapted to the localization device 30 shown in FIG. 3 according to one embodiment of the present disclosure. The method shown in FIG. 4 can be compiled into the code 333 and stored in the memory 331 of the localization device 30.

The code 333 is used to instruct the processor 330 of the localization device 30 to perform the following steps.

Step 400: Begin.

Step 401: Determining whether or not a plurality of UWB hardware measurement deviations are calibrated. If not, proceed to step 402; if yes, proceed to step 405.

Step 402: Obtaining the measurement distances and the actual altitudes between the tag and each of the anchors.

Step 403: Obtaining the UWB hardware measurement deviations through the LSQ method.

Step 404: Recording the UWB hardware measurement deviations; then returning to step 401.

Step 405: Determining whether or not the anchor coordinates are automatically measured. If not, proceed to step 406; if yes, proceed to step 408.

Step 406: Obtaining the measurement distances between the tag and each of the anchors and deducting the UWB hardware measurement deviations from the measurement distances.

Step 407: Calculating the anchor coordinates; then returning to step 405.

Step 408: Obtaining the distances between each of the anchors and the tag, and subtracting the deviations from the distances.

Step 409: Calculating the tag coordinate.

Step 410: Transmitting the tag coordinates in real time.

Step 411: Determining whether or not to calculate the tag coordinate. If yes; proceed to step 408; if not, proceed to step 412.

Step 412: End.

In step 401 to step 404, the localization device 30 (or the tag T in FIG. 2) determines whether or not the UWB hardware measurement deviations are calibrated; when the UWB hardware measurement deviations are not calibrated, the localization device 30 obtains the respective measurement distances $d_1$ to $d_N$ between each of the anchors $A_1$ to $A_N$ and the tag T, and the actual altitudes $D_1$ to $D_N$ of the tag T through the distance measurement module 31. The UWB hardware measurement deviations $E_1$ to $E_N$ are then obtained using the LSQ method through the processor 330; and then the UWB hardware measurement deviations $E_i$ to $d_N$, the measurement distances $d_1$ to $d_N$, and the actual altitudes $D_1$ to $D_N$ are recorded through the memory 331.

When the UWB hardware measurement deviations are calibrated, in step 405 to step 407, the localization device 30 determines whether or not the anchor coordinates $A_1(x_1, y_1, z_1)$ to $A_N(x_N, y_N, z_N)$ have been automatically measured.

When the anchor coordinates $A_1 (x_1, y_1, z_1)$ to $A_N(x_N, y_N, z_N)$ are not automatically measured, the localization device 30 obtains the measurement distances $d_1$ to $d_N$ from the memory 331 through the processor 330 and the UWB hardware measurement deviations $E_1$ to $E_N$, the UWB hardware measurement deviations $E_1$ to $E_N$ are respectively subtracted from the measurement distances $d_1$ to $d_N$, and then the anchor coordinates $A_1(x_1, y_1, z_1)$ to $A_N(x_N, y_N, z_N)$ are calculated through the processor 330.

When the anchor coordinates $A_1(x_1, y_i, z_i)$ to $A_N(x_N, y_N, z_N)$ have been automatically measured, in step 408 to step 410, the localization device 30 obtains the measurement distances $d_1$ to $d_N$ from the memory 331 through the processor 330 and the UWB hardware measurement deviations $E_1$ to $E_N$, the UWB hardware measurement deviations $E_1$ to $E_N$ are respectively subtracted from the measurement distances $d_1$ to $d_N$; the coordinate $\vec{T}(\tilde{x},\tilde{y},\tilde{z})$ of the tag T is calculated through the processor 330, and then the coordinate $\vec{T}(\tilde{x},\tilde{y},\tilde{z})$ of the tag T is transmitted (to the UTM cloud server 10) in real time. In step 409, the processor 330 calculates the coordinate $\vec{T}(\tilde{x},\tilde{y},\tilde{z})$ of the tag T according to the cost function represented by equation (6), equation (7), and equation (8).

Finally, in step 411, the localization device 30 determines whether or not the coordinate $\vec{T}(\tilde{x},\tilde{y},\tilde{z})$ of the tag T is required to be calculated. In one embodiment, the localization device 30 receives the control signal CTRL through the second communication module 332, and determines whether or not the coordinate $\vec{T}(\tilde{x},\tilde{y},\tilde{z})$ of the tag T is required to be calculated according to the control signal CTRL. When the coordinate $\vec{T}(\tilde{x},\tilde{y},\tilde{z})$ of the tag T is required to be calculated, the localization device 30 executes step 408 to step 410 again so as to execute the localization operation. On the other hand, when the coordinate $\vec{T}(\tilde{x},\tilde{y},\tilde{z})$ of the tag T is not required to be calculated, the localization device 30 terminates the localization operation.

Therefore, through executing the process shown in FIG. 4, the localization device 30 of the present disclosure can implement the UWB localization model 2 shown in FIG. 2, and can be applied to the UTM system shown in FIG. 1.

Figure 5:
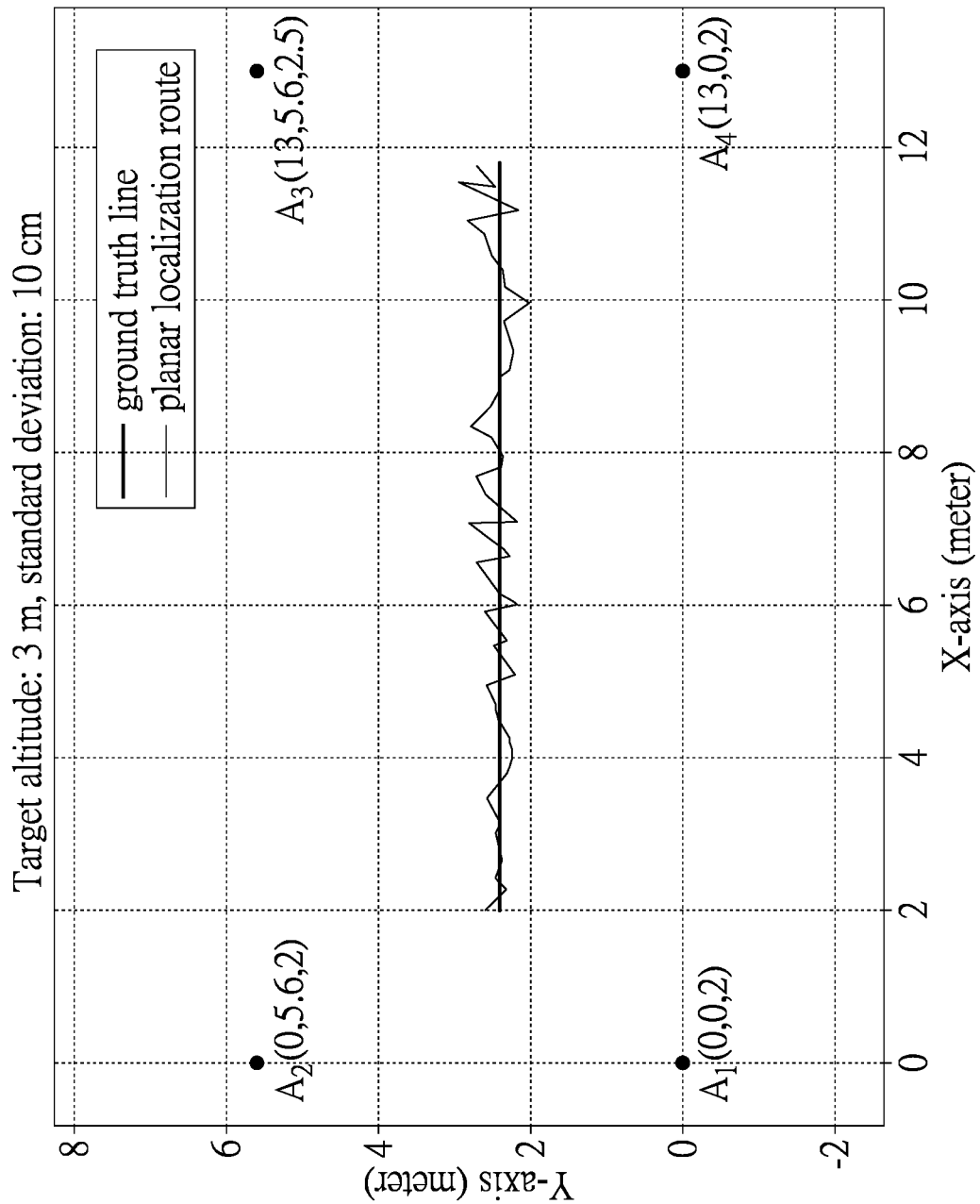
FIG. 5 to FIG. 7 are respectively a planar localization route map, an altitude localization route map, and a localization deviation cumulative distribution function diagram of a simulation of an UAV flying at a target altitude of three meters according to one embodiment of the present disclosure.
Figure 6:
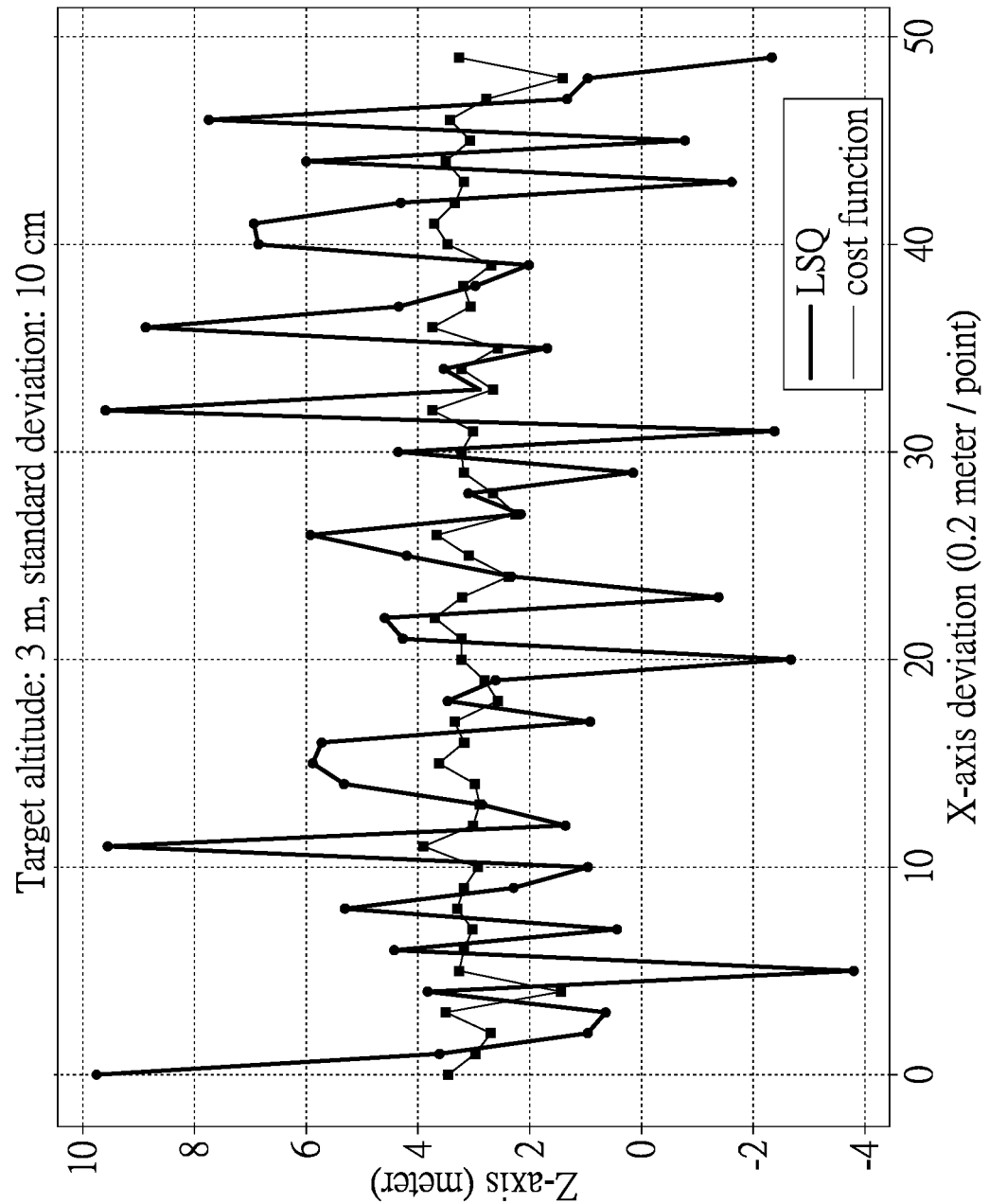
Figure 7:
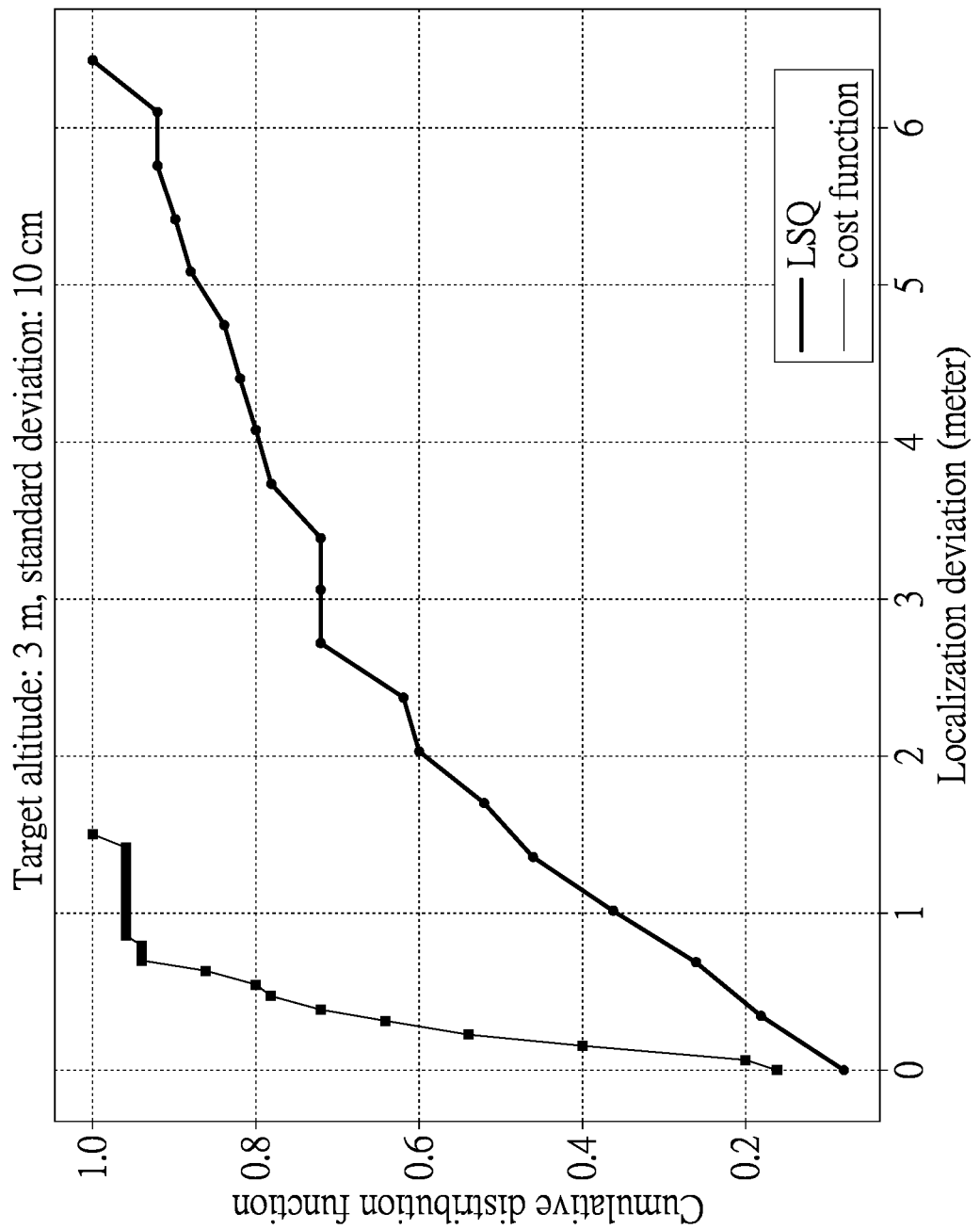

FIG. 5 to FIG. 7 are respectively a planar localization route map, an altitude localization route map, and a localization deviation cumulative distribution function diagram of a simulation of an UAV flying at a target altitude of three meters and a simulation of a UWB measurement distance standard deviation of 10 centimeters according to one embodiment of the present disclosure. As shown in FIG. 5, a datum plane line is represented by a thick solid line, a planar localization route is represented by a thin solid line, and coordinates of the anchors $A_1$ to $A_4$ are (0, 0, 2), (0, 5.6, 2), (13, 5.6, 2.5), and (13, 0, 2), respectively. The X-axis coordinates and the Y-axis coordinates of the tag T of the planar localization route shown in FIG. 5 are obtained through using the LSQ method.

In FIG. 6 and FIG. 7, an altitude localization route of the Z-axis coordinate of the tag T and the localization deviation accumulation curve obtained through the LSQ method are represented by a thick solid line, and an altitude localization route and the localization deviation accumulation curve of the Z-axis coordinate of the tag T obtained through the cost function method of the present disclosure (i.e., the cost function represented by equation (6) and the method shown in FIG. 4) are represented by a thin solid line. A comparison result between the simulations illustrated in FIG. 6 and FIG. 7 respectively is shown in Table 1 below.

TABLE 1

|  | LSQ method | Cost function method |
|---|---|---|
| Z-axis coordinate range | −4 m to 10 m | 1 m to 4 m |
| 95% localization deviation accumulation value | 6.59 m | 0.84 m |

According to Table 1, a Z-axis coordinate range obtained by the localization method of the present disclosure is closer to the target altitude of three meters, and the 95% localization deviation accumulation value is less than 1 meter. Therefore, compared with the conventional LSQ method, the localization method of the present disclosure can effectively improve the localization accuracy of the Z-axis coordinate.

Figure 8:
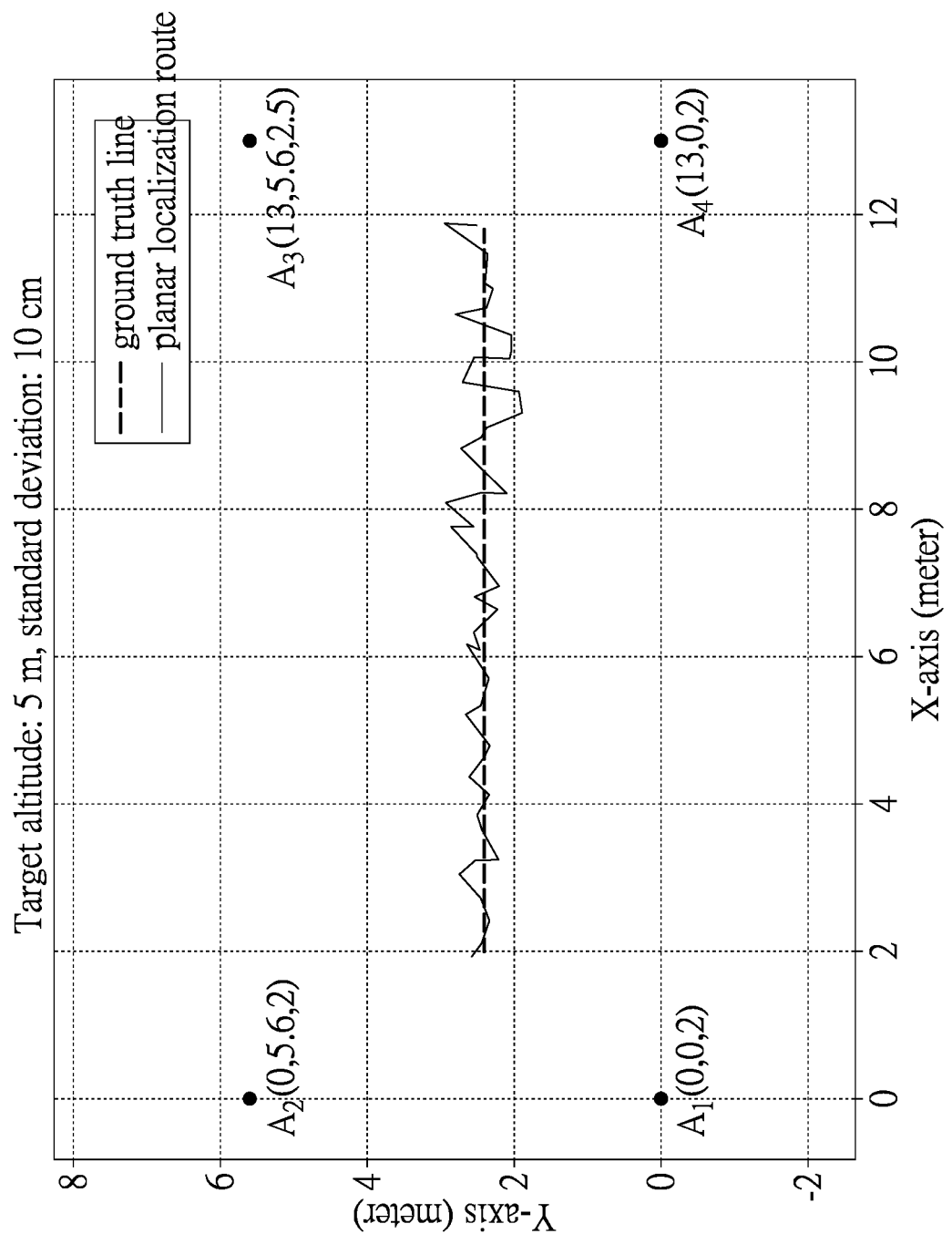
FIG. 8 to FIG. 10 are respectively a planar localization route map, an altitude localization route map, and a localization deviation cumulative distribution function diagram of a simulation of a UAV flying at a target altitude of five meters according to one embodiment of the present disclosure.
Figure 9:
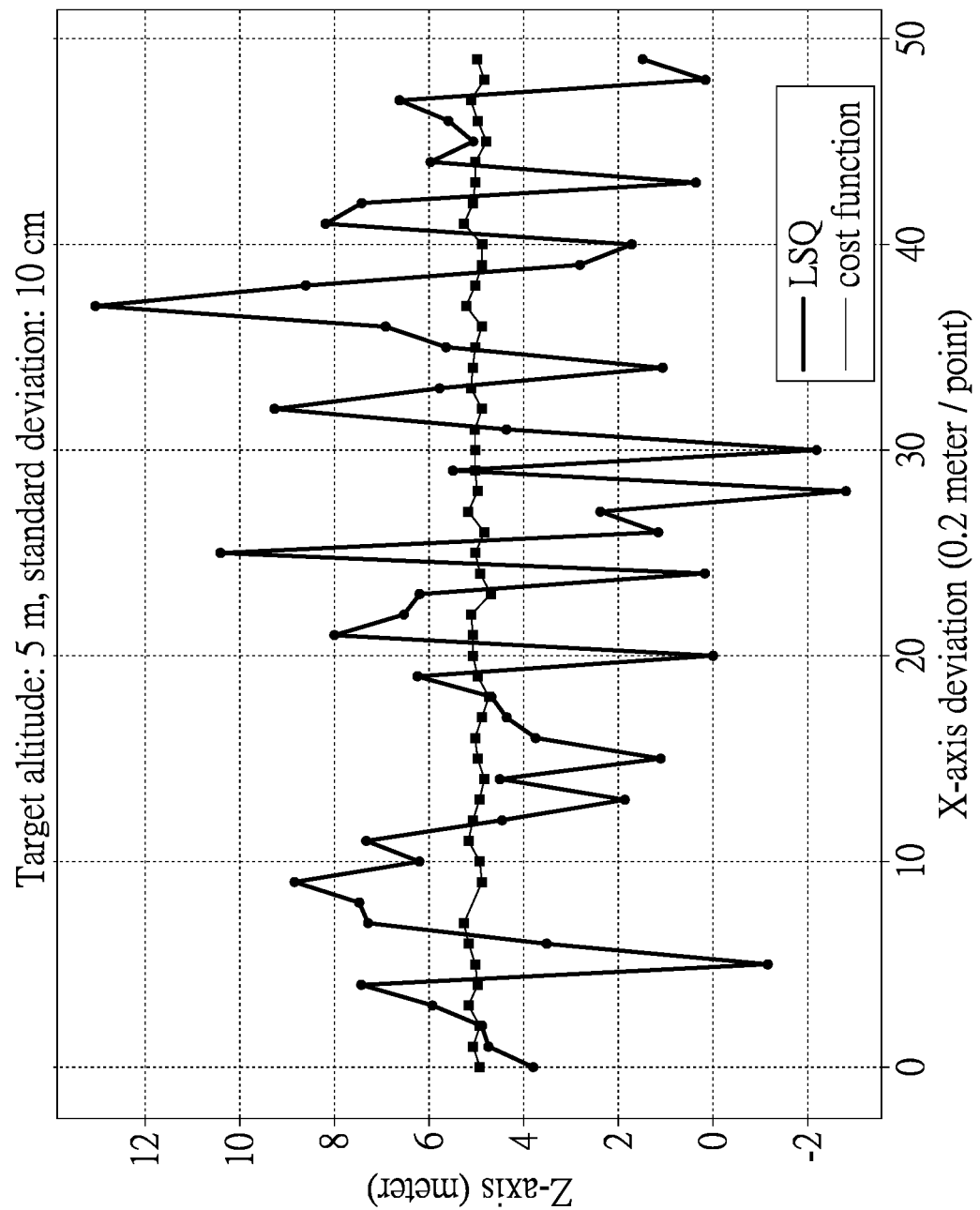
Figure 10:
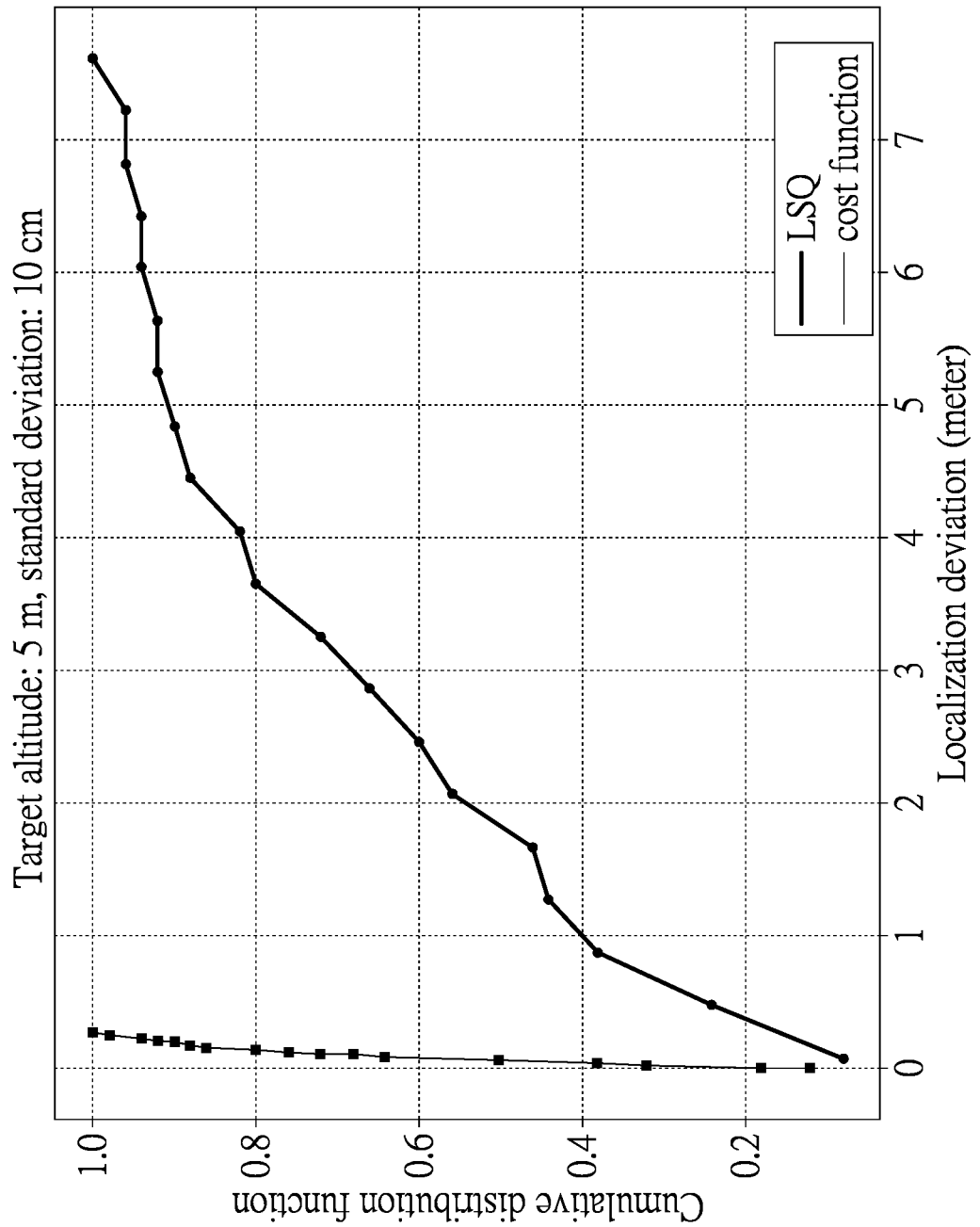

FIG. 8 to FIG. 10 are respectively a planar localization route map, an altitude localization route map, and a localization deviation accumulative distribution function diagram of a simulation of a UAV flying at a target altitude of five meters and a simulation of a UWB measurement distance standard deviation of 10 centimeters according to one embodiment of the present disclosure. In FIG. 8, the datum plane line is represented by a thick broken line, and the planar localization route is represented by a thin solid line, and the coordinates of the anchors $A_1$ to $A_4$ are (0, 0, 2), (0, 5.6, 2), (13, 5.6, 2.5), and (13, 0, 2), respectively. The X-axis coordinates and the Y-axis coordinates of the tag T of the planar localization route shown in FIG. 8 are obtained through using the LSQ method.

In FIG. 9 and FIG. 10, the altitude localization route of the Z-axis coordinate of the tag T and the localization deviation accumulation curve obtained through the LSQ method are represented by a thick solid line, and the altitude localization route and the localization deviation accumulation curve of the Z-axis coordinate of the tag T obtained through the cost function method of the present disclosure are represented by a thin solid line. A comparison result between the simulations illustrated in FIG. 9 and FIG. 10 respectively is shown in Table 2 below.

TABLE 2

|  | LSQ method | Cost function method |
|---|---|---|
| Z-axis coordinate range | −3 m to 13 m | 4.5 m to 5.5 m |
| 95% localization deviation accumulation value | 6.7 m | 0.25 m |

According to Table 2, the Z-axis coordinate range obtained by the localization method of the present disclosure is closer to the target altitude of five meters, and the 95% localization deviation accumulation value is less than 1 meter. Therefore, compared with the conventional LSQ method, the localization method of the present disclosure can effectively improve the localization accuracy of the Z-axis coordinate.

Figure 11:
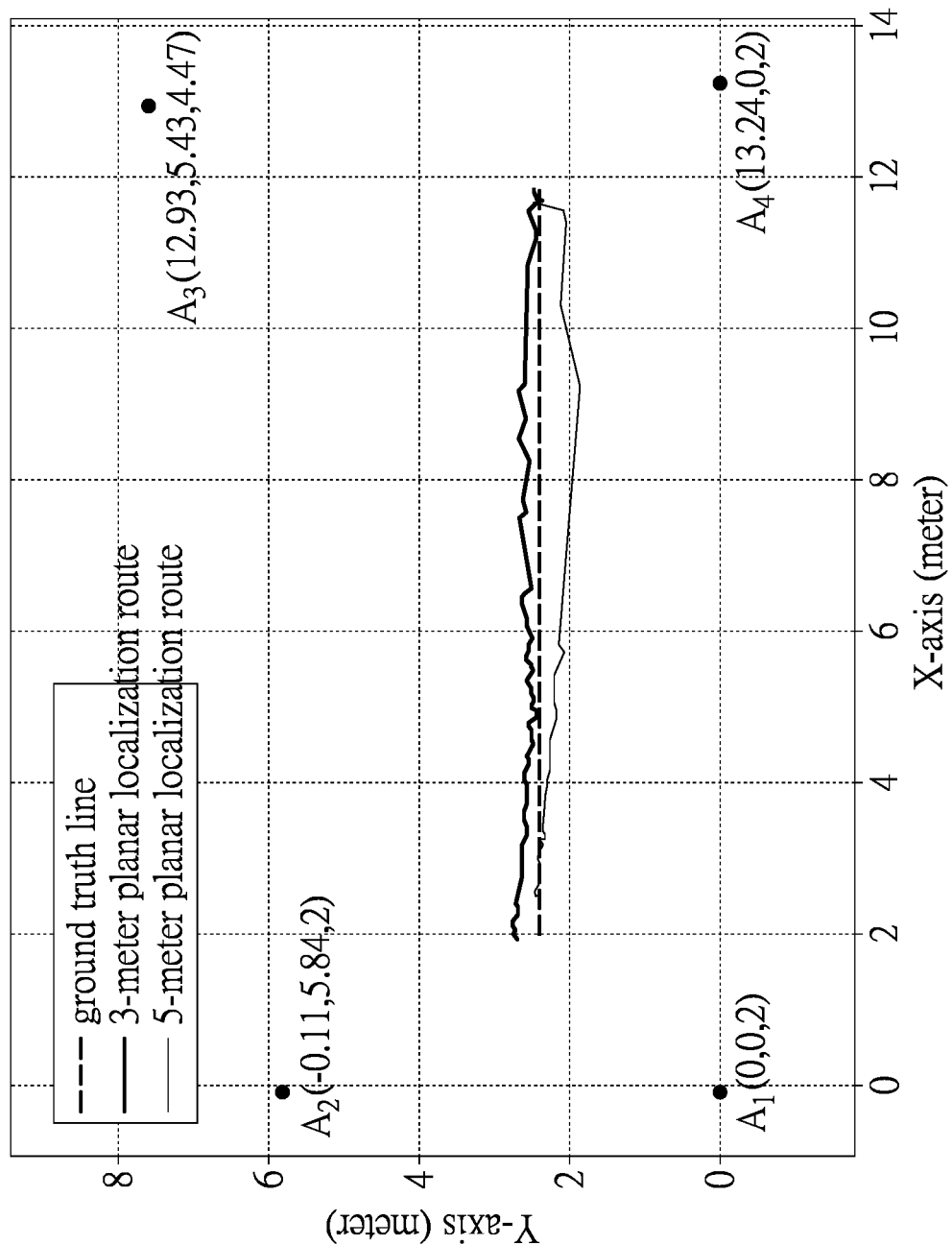
FIG. 11 to FIG. 13 are respectively a planar localization route map, an altitude localization route map, and a localization deviation cumulative distribution function diagram of a simulation of a UAV flying at a target altitude of three meters and five meters according to one embodiment of the present disclosure.
Figure 12:
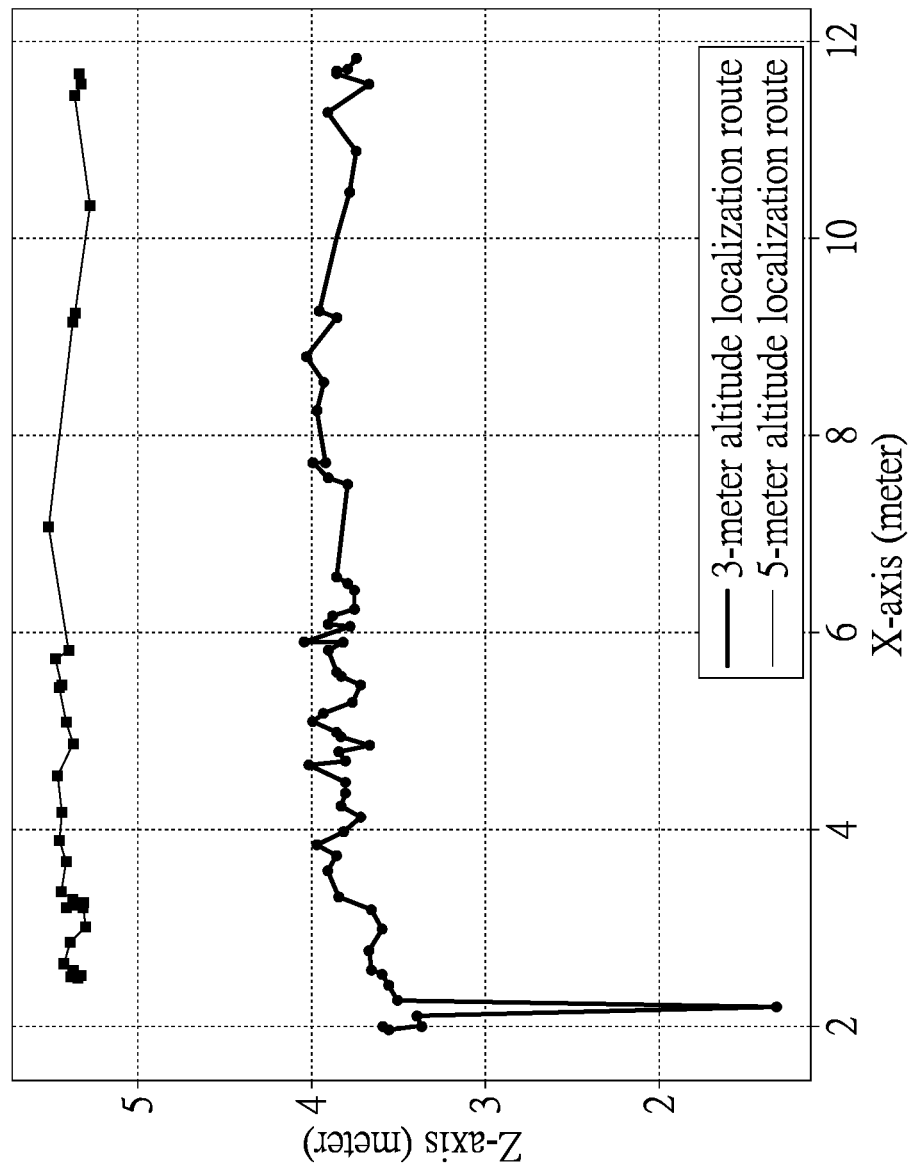
Figure 13:
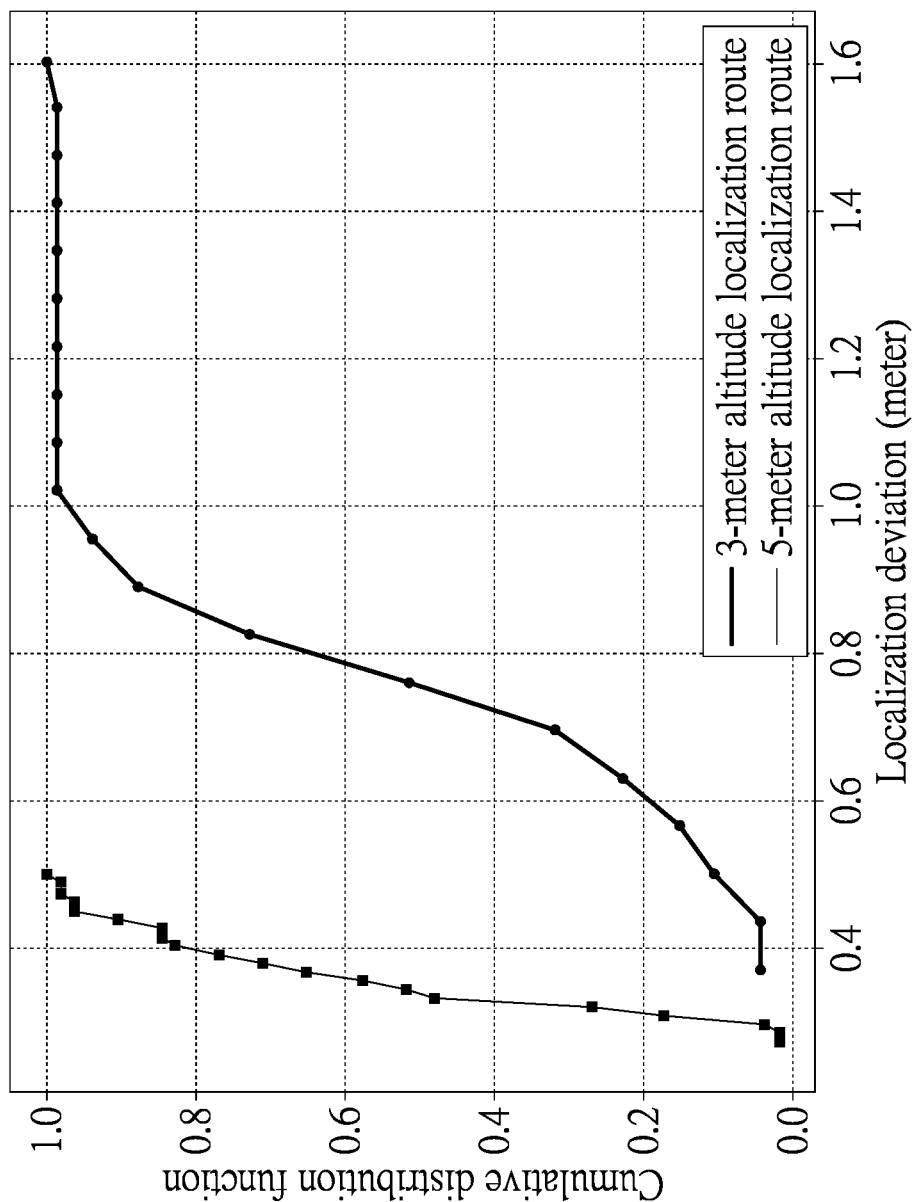

FIG. 11 to FIG. 13 are respectively a planar localization route map, an altitude localization route map, and a localization deviation accumulative distribution function diagram of a simulation of an UAV flying at a target altitude of three meters and five meters according to one embodiment of the present disclosure. In FIG. 11, the datum plane line is represented by a thick broken line, a three-meter planar localization route is represented by a thick solid line, a five-meter planar localization route is represented by a thin solid line, and the coordinates of the anchors $A_1$ to $A_4$ are respectively (0, 0, 2), (−0.11, 5.84, 2), (12.93, 5.43, 4.47), and (13.24, 0, 2). The X-axis coordinates and the Y-axis coordinates of the tag T of the planar localization route shown in FIG. 11 are obtained through using the LSQ method.

In FIG. 12 and FIG. 13, the cost function method of the present disclosure is used to obtain a 3-meter altitude localization route and a 3-meter localization deviation accumulation curve of the Z-axis coordinate of the tag T that are each represented by a thick solid line, and a 5-meter altitude localization route and a 5-meter localization deviation accumulation curve that are each represented by a thick solid line. A comparison result between the simulations illustrated respectively in FIG. 12 and FIG. 13 is shown in Table 3 below.

TABLE 3

| | Target altitude: 3 m | Target altitude: 5 m |
|---|---|---|
| Z-axis coordinate range | 1 m to 4 m | 5 m to 6 m |
| 95% localization deviation accumulation value | 1.01 m | 0.45 m |

According to Table 3, in the localization method of the present disclosure, the higher the target altitude is, the lower the 95% localization deviation accumulation value is (i.e., the 95% localization deviation accumulation value of the target altitude of five meters is less than that of the target altitude of three meters). In other words, in the localization method of the present disclosure, the greater a distance between a flying altitude and an anchor, the higher the localization accuracy of the Z-axis coordinate.

BENEFICIAL EFFECTS OF THE EMBODIMENT

One of the beneficial effects of the UWB localization method, device, and system of the present disclosure is that the UWB localization method, device, and system can increase localization accuracy of the Z-axis coordinate through technical solutions of "measuring the measurement distances between the tag and the anchors, respectively through the UWB wireless communication technology" and "calculating a third coordinate component of the tag coordinate according to the cost function".

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An ultra-wideband (UWB) localization method, adapted to a UWB localization system, the UWB localization system including a tag and a plurality of anchors, the UWB localization method comprising:
   determining whether or not a plurality of UWB hardware measurement deviations are calibrated;
   determining, when the UWB hardware measurement deviations are calibrated, whether or not a plurality of anchor coordinates of the anchors are automatically measured;
   obtaining, when the anchor coordinates of the anchors are automatically measured, a plurality of measurement distances between each of the anchors and the tag, respectively, and deducting the UWB hardware measurement deviations from the measurement distances, respectively; and
   calculating a tag coordinate of the tag according to the measurement distances from which the UWB hardware measurement deviations are deducted;
   wherein the step of calculating the tag coordinate of the tag further includes:
   calculating a plurality of first factors, which is expressed by the following equation:

$d'^2_i = d^2_i - [(\tilde{x}-x_i)^2 + (\tilde{y}-y_i)^2]$, wherein $d'_i$ is the $i^{th}$ first factor of the plurality of first factors, $d_i$ is a distance between the tag and the $i^{th}$ anchor of the plurality of anchors, $\tilde{x}$ is a X-axis coordinate of the tag, $x_i$ is an X-axis coordinate of the $i^{th}$ anchor of the plurality of anchors, $y_i$ is a Y-axis coordinate of the $i^{th}$ anchor of the plurality of anchors, and $\tilde{y}$ is a Y-axis coordinate of the tag;
   defining a plurality of second factors as a plurality of differences between a plurality of Z-axis coordinates of the anchor coordinates and an average height of the anchors, wherein a Z-axis coordinate of the tag coordinate is greater than the average height; and
   calculating the Z-axis coordinate of the tag coordinate according to the plurality of first factors, the plurality of second factors and a cost function, wherein the cost function is indicated as:

$$\varepsilon(\tilde{z}') = \frac{1}{N} \times \sum_{i=1}^{N} [(\tilde{z}' - z'_i)^2 - d'^2_i]^2,$$

wherein $\tilde{z}'$ is the Z-axis coordinate of the tag coordinate, N is a quantity of the anchors, N is an integer greater than 3, $z'_i$ is the $i^{th}$ second factor of the plurality of second factors, $d'_i$ is the $i^{th}$ first factor of the plurality of first factors, and i is an integer between 1 and N.

2. The UWB localization method according to claim 1, wherein, when the UWB hardware measurement deviations are not calibrated, the UWB localization method further comprises:
   obtaining the measurement distances between each of the anchors and the tag, respectively, and a plurality of actual altitudes of the tag;
   obtaining the UWB hardware measurement deviations through a least squares error approach, according to the measurement distances and the actual altitudes; and
   recording the UWB hardware measurement deviations.

3. The UWB localization method according to claim 2, wherein the measurement distances are calculated according to a double-sided two-way ranging method, and the actual altitudes are calculated according to an infrared ranging method.

4. The UWB localization method according to claim 1, wherein, when the UWB hardware measurement deviations are not calibrated, the UWB localization method further comprises:
   obtaining the measurement distances between each of the anchors and the tag, respectively;
   deducting the UWB hardware measurement deviations from the measurement distances, respectively; and
   calculating the anchor coordinates according to the measurement distances from which the UWB hardware measurement deviations are deducted.

5. An ultra-wideband (UWB) localization device adapted to a UWB localization system including a tag, a plurality of anchors, and a traffic management cloud server, the UWB localization device being disposed on the tag, the UWB localization device comprising:
   a distance measurement module for measuring a plurality of measurement distances between each of the anchors and the tag, respectively, and for measuring a plurality of actual altitudes between the tag and a datum plane;

a first communication module coupled to the distance measurement module and being used to transmit the measurement distances and the actual altitudes; and a processing module coupled to the first communication module, which is used to calculate a tag coordinate of the tag according to the measurement distances and the actual altitudes and then transmit the tag coordinate to the traffic management cloud server;

wherein the processing module calculates a plurality of first factors, which is expressed by the following equation:

$$d'^2_i = d^2_i - [(\tilde{x}-x_i)^2 + (\tilde{y}-y_i)^2],$$

wherein $d'_i$ is the $i^{th}$ first factor of the plurality of first factors, $d_i$ is a distance between the tag and the $i^{th}$ anchor of the plurality of anchors, $\tilde{x}$ is an X-axis coordinate of the tag, $x_i$ is an X-axis coordinate of the $i^{th}$ anchor of the plurality of anchors, $y_i$ is a Y-axis coordinate of the $i^{th}$ anchor of the plurality of anchors, and $\tilde{y}$ is a Y-axis coordinate of the tag;

wherein the processing module defines a plurality of second factors as a plurality of differences between a plurality of Z-axis coordinates of the anchor coordinates and an average height of the anchors, wherein a Z-axis coordinate of the tag coordinate is greater than the average height; and wherein the processing module calculates the Z-axis coordinate of the tag coordinate according to the plurality of first factors, the plurality of second factors and a cost function, wherein the cost function is indicated as:

$$\varepsilon(\tilde{z}') = \frac{1}{N} \times \sum_{i=1}^{N} [(\tilde{z}' - z'_i)^2 - d'^2_i]^2,$$

wherein $\tilde{z}'$ is the Z-axis coordinate of the tag coordinate, N is a quantity of the anchors, N is an integer greater than 3, $z'_i$ is the $i^{th}$ second factor of the plurality of second factors, $d'_i$ is the $i^{th}$ first factor of the plurality of first factors, and i is an integer between 1 and N.

6. The UWB localization device according to claim 5, wherein the processing module includes:

a processor coupled to the first communication module and being used to calculate a plurality of UWB hardware measurement deviations of the distance measurement module and a plurality of anchor coordinates of the anchors according to the measurement distance and the actual altitudes;

a memory coupled to the processor and being used to store a code, the measurement distances, the actual altitudes, the UWB hardware measurement deviations, and the anchor coordinates; and a second communication module coupled to the processor and being used to transmit the tag coordinate to the traffic management cloud server.

7. The UWB localization device according to claim 6, wherein the code is used to instruct the processor to execute a UWB localization method, the UWB localization method includes:

determining, through the processor, whether or not the UWB hardware measurement deviations are calibrated;

determining, through the processor, when the UWB hardware measurement deviations are calibrated, whether or not the anchor coordinates of the anchors are automatically measured;

obtaining, through the distance measurement module, when the anchor coordinates of the anchors are automatically measured, the measurement distances between each of the anchors and the tag, respectively;

deducting, through the processor, the UWB hardware measurement deviations from the measurement distances, respectively; and calculating, through the processor, the tag coordinate of the tag according to the measurement distances from which the UWB hardware measurement deviations are deducted.

8. The UWB localization device according to claim 7, wherein, when the UWB hardware measurement deviations are not calibrated, the UWB localization method further includes:

obtaining, through the distance measurement module, the measurement distances between each of the anchors and the tag, respectively, and the actual altitudes of the tag;

obtaining, through the processor, the UWB hardware measurement deviations through a least squares error approach, according to the measurement distances and the actual altitudes; and recording the UWB hardware measurement deviations through a memory.

9. The UWB localization device according to claim 7, wherein, when the UWB hardware measurement deviations are not calibrated, the UWB localization method further includes:

obtaining, through the distance measurement module, the measurement distances between each of the anchors and the tag, respectively;

deducting, through the processor, the UWB hardware measurement deviations from the measurement distances, respectively; and calculating, through the processor, the anchor coordinates according to the measurement distances from which the UWB hardware measurement deviations are deducted.

10. The UWB localization device according to claim 5, wherein the measurement distances are calculated according to a double-sided two-way ranging method, and the actual altitudes are calculated according to an infrared ranging method.

11. The UWB localization device according to claim 5, wherein the tag is an unmanned aerial vehicle, an unmanned aircraft, or a drone.

12. An ultra-wideband (UWB) localization system, comprising:

a tag;

a plurality of anchors;

a traffic management cloud server; and a UWB localization device configured on the tag, including:

a distance measurement module for measuring a plurality of measurement distances between each of the anchors and the tag, respectively, and for measuring a plurality of actual altitudes between the tag and a datum plane;

a first communication module coupled to the distance measurement module and being used to transmit the measurement distances and the actual altitudes; and a processing module coupled to the first communication module and being used to calculate a tag coordinate of the tag according to the measurement distances and the actual altitudes and then transmit the tag coordinate to the traffic management cloud server;

wherein the processing module calculates a plurality of first factors, which is expressed by the following equation:

$$d'^2_i = d_i^2 - [(\tilde{x}-x_i)^2 + (\tilde{y}-y_i)^2],$$

wherein $d'_i$ is the first factor of the plurality of first factors, $d_i$ is a distance between the tag and the $i^{th}$ anchor of the plurality of anchors, $\tilde{x}$ is an X-axis coordinate of the tag, $x_i$ is an X-axis coordinate of the $i^{th}$ anchor of the plurality of anchors, $y_i$ is a Y-axis coordinate of the $i^{th}$ anchor of the plurality of anchors, and $\tilde{y}$ is a Y-axis coordinate of the tag;

wherein the processing module defines a plurality of second factors as a plurality of differences between a plurality of Z-axis coordinates of the anchor coordinates and an average height of the anchors, wherein a Z-axis coordinate of the tag coordinate is greater than the average height; and wherein the processing module calculates the Z-axis coordinate of the tag coordinate according to the plurality of first factors, the plurality of second factors and a cost function, wherein the cost function is indicated as:

$$\varepsilon(\tilde{z}') = \frac{1}{N} \times \sum_{i=1}^{N} [(\tilde{z}' - z'_i)^2 - d'^2_i]^2,$$

wherein $\tilde{z}'$ is the Z-axis coordinate of the tag coordinate, $N$ is a quantity of the anchors, $N$ is an integer greater than 3, $z'_i$ is the $i^{th}$ second factor of the plurality of second factors, $d'_i$ is the $i^{th}$ first factor of the plurality of first factors, and $i$ is an integer between 1 and $N$.

13. The UWB localization system according to claim 12, wherein the measurement distances are calculated according to a double-sided two-way ranging method, and the actual altitudes are calculated according to an infrared ranging method.

14. The UWB localization system according to claim 12, wherein the processing module includes:
a processor coupled to the first communication module and being used to calculate a plurality of UWB hardware measurement deviations of the distance measurement module and a plurality of anchor coordinates of the anchors according to the measurement distance and the actual altitudes;
a memory coupled to the processor and being used to store a code, the measurement distances, the actual altitudes, the UWB hardware measurement deviations, and the anchor coordinates; and
a second communication module coupled to the processor and being used to transmit the tag coordinate to the traffic management cloud server.

15. The UWB localization system according to claim 14, wherein the code is used to instruct the processor to execute a UWB localization method, the UWB localization method includes:
determining, through the processor, whether or not the UWB hardware measurement deviations are calibrated;
determining, through the processor, when the UWB hardware measurement deviations are calibrated, whether or not the anchor coordinates of the anchors are automatically measured;
obtaining, through the distance measurement module, when the anchor coordinates of the anchors are automatically measured, the measurement distances between each of the anchors and the tag, respectively;
deducting, through the processor, the UWB hardware measurement deviations from the measurement distances, respectively; and
calculating, through the processor, the tag coordinate of the tag according to the measurement distances from which the UWB hardware measurement deviations are deducted.

\* \* \* \* \*